US005650774A

United States Patent [19]

Drori

[11] Patent Number: 5,650,774

[45] **Date of Patent: *Jul. 22, 1997**

[54] ELECTRONICALLY PROGRAMMABLE REMOTE CONTROL ACCESS SYSTEM

[75] Inventor: Ze'ev Drori, Chatsworth, Calif.

[73] Assignee: Clifford Electronics, Inc., Chatsworth, Calif.

[ * ] Notice: The term of this patent shall not extend beyond the expiration date of Pat. No. 5,146,215.

[21] Appl. No.: 334,843

[22] Filed: Nov. 4, 1994

Related U.S. Application Data

[63] Continuation of Ser. No. 118,167, Sep. 8, 1993, abandoned, which is a continuation of Ser. No. 944,038, Sep. 11, 1992, abandoned, which is a continuation of Ser. No. 719,095, Jun. 20, 1991, abandoned, which is a continuation of Ser. No. 555,357, Jul. 17, 1990, abandoned, which is a continuation of Ser. No. 406,837, Sep. 13, 1989, abandoned, which is a continuation of Ser. No. 94,395, Sep. 8, 1987, abandoned.

[51] Int. Cl.$^{6}$ .................................................. G06F 7/04

[52] U.S. Cl. ............................ 340/825.32; 340/825.31; 340/825.69; 340/825.72

[58] Field of Search ............................ 307/10.2; 70/278; 340/528, 541, 543, 542, 825.31, 825.32, 825.69, 825.71; 361/172

[56] References Cited

U.S. PATENT DOCUMENTS

| | | | |
|---|---|---|---|
| 3,337,992 | 8/1967 | Tolson | 49/29 |
| 4,148,012 | 4/1979 | Baump et al. | 340/149 |
| 4,177,657 | 12/1979 | Aydin | 70/219 |
| 4,236,068 | 11/1980 | Walton | 235/380 |
| 4,245,212 | 1/1981 | Cirimele | 340/147 |
| 4,383,242 | 5/1983 | Sassover et al. | 340/64 |
| 4,525,805 | 7/1985 | Prosan et al. | 364/900 |
| 4,535,333 | 8/1985 | Twardowski | 340/825.72 |
| 4,573,046 | 2/1986 | Pinnow | 340/825.56 |
| 4,626,848 | 12/1986 | Ehlers | 340/825.72 |
| 4,652,860 | 3/1987 | Weishaupt et al. | 340/825.31 |
| 4,665,397 | 5/1987 | Pinnow | 340/825.72 |
| 4,750,118 | 6/1988 | Heitschel et al. | 340/825.69 |
| 4,754,255 | 6/1988 | Sanders et al. | 340/64 |
| 5,146,215 | 9/1992 | Drori | 340/825.32 |

FOREIGN PATENT DOCUMENTS

| | | |
|---|---|---|
| WO-A-8501 980 | 5/1985 | European Pat. Off. . |
| 0139059 | 5/1985 | European Pat. Off. . |
| 0162171 | 11/1985 | European Pat. Off. . |
| 0306598 | 3/1989 | European Pat. Off. . |
| 2580128 | 10/1986 | France . |
| 2116808 | 9/1983 | United Kingdom . |

OTHER PUBLICATIONS

Translation Document Re French Patent 2,580,128.

*Primary Examiner*—Regina D. Liang

[57] ABSTRACT

A remote control access system which may be in the form of a security system or a convenience system for buildings and vehicles to thereby enable access opening and closing of buildings and vehicles. The system is operable on a remote control basis and comprises one or more hand held remote transmitters and a receiver unit located at or near the building or in the vehicle. The receiver is operable in conjunction with a control unit which contains a microprocessor capable of performing control functions and decoding functions. The remote control access system is unique in that it enables the user to electronically program into or delete from the receiver a digital code or so-called encoding signal from any of a plurality of transmitters. Each transmitter may contain not only different numbers of digital codes, but also a code generated by an entirely different method of encoding. Moreover, it is not necessary for the user or anyone else to know the specific encoded signal which is transmitted from any of the transmitters to the receiver. The receiver is operable with a plurality of transmitters, all of which operate on the same frequency. The present invention also provides an anti-sequencing capability such that one cannot use an electronic sequencer for detecting the code of the transmitter for purposes of violating the security system.

15 Claims, 4 Drawing Sheets

ELECTRONICALLY PROGRAMMABLE REMOTE CONTROL ACCESS SYSTEM

This is a continuation of application Ser. No. 08/118,167 filed on Sept. 8, 1993 now abandoned, which is continuation of Ser. No. 07/944,038 filed on Sept. 11, 1992 abandoned, which is continuation of Ser. No. 07/719,095 filed on Jun. 20, 1991, abandoned, which is continuation of Ser. No. 07/555,357 filed on Jul. 17, 1990, abandoned, which is continuation of Ser. No. 07/406,837 filed on Sept. 13, 1989, abandoned, which is continuation of Ser. No. 07/094,395 filed on Sept. 8, 1987, now abandoned.

BACKGROUND OF THE INVENTION

1. Field of the Invention

This invention relates in general to certain new and useful improvements in remote control access systems, and more particularly, to remote control access systems which are comprised of a receiver-control unit located at or near an enclosed environment, and one or more remote transmitters, and which systems are electronically programmable by any user without knowledge of the specific code used or operation of the system itself.

2. Brief Description of the Prior Art

Remote control systems are widely used in a large number of applications in which a receiver is located to control some type of electronic equipment and which is operable by one or more remotely located transmitters. Usually, these receiver-transmitter arrangements are radio frequency operated, although they can be operated with other forms of electromagnetic radiation or sound energy.

The remote control access systems may adopt the form of convenience systems such as garage door openers which control the opening and closing of a garage door, as well as security systems such as those providing controlled entry into vehicles and buildings. The area which is to be secured by the remote control access system is often referred to as "protected environment" or the "secured environment."

In recent years, and primarily due to the increase of theft, vandalism and burglaries, many home and vehicle owners have installed remote access control systems, such as security systems and remote controlled garage door systems. The vast majority of these security systems, when triggered, will generate an audible or visible alarm signal or otherwise a silent alarm signal transmitted to a security force, such as a police department to alert of an improper entry or an improper intrusion into the protected area. Many of these commercially available security systems are remotely operable, that is, they include a receiver capable of being operated from a remotely located transmitter for purposes of arming and dis-arming the security system.

The present state of the art in conventional automotive vehicle security systems usually includes an alarm section which may either generate an audible alarm, as for example, from a siren, a horn, or the like and may also often activate a visible alarm by operating any of the vehicle lights. Many of these commercially available vehicle security systems may also disable some portion of the vehicle engine system such as the ignition system, starter, fuel pump, or lock the engine compartment. Thus, in the event of an improper intrusion or attempted theft of the vehicle, the security system will cause initiation of an audible alarm or cause the lights to switch on and off and may also interfere with operation of the vehicle engine system.

The use of a transmitter and a receiver which have been pre-coded is generally standard with all commercially available remote control access systems and other remote control systems. In these transmitter-receiver combinations, the code, usually referred to as an encoded signal, is permanently encoded into the receiver.

In the remote control security systems, the transmitter is always pre-programmed with respect to the receiver and the code can't be altered or changed by the user. In other words, the receiver can only operate on the basis of a security code permanently encoded in that receiver and transmitted from a particular transmitter matched and sold with that receiver.

In addition to being quite limiting to and having a security exposure in case of a loss or stolen transmitter they also present many constraints on the manufacturers, customers and dealers of these security systems. For instance, if the user of one of these prior art security systems should lose his or her transmitter, it is necessary to obtain another transmitter which was not previously coded and have that transmitter properly matched and coded for the particular receiver.

The encoding of the transmitter entails, at very least, obtaining the particular code to introduce into the transmitter for activating the receiver. This encoding also includes the requirements of opening the transmitter and then mechanically coding the transmitter. Usually, the coding is accomplished by scratching conductive lines on a printed circuit board, closing or opening switches or the like. Some transmitters are provided with control boards having hole areas capable of being punched to provide a particular encoded signal. In any event, some form of mechanical action is usually required for encoding the transmitter after the latter has been opened.

Usually, most users of the remote control access systems are not capable of encoding the transmitters on their own, and therefore, must seek the assistance of the retailer or manufacturer of the system. The mere fact that the code for authorized actuation of the security system must be known by the selling dealer or manufacturer may inevitably lead to a breach of the security system itself, since the code is usually written to maintain a permanent record of the same. More importantly should the user wish to change the code because of a lost or stolen transmitter, both the transmitter and the receiver will have to be sent back to the manufacturer. This is a time consuming task which leaves the user without the security system, in addition to being costly.

In addition to the foregoing, if a user desires to have several transmitters operate the receivers of several remote control access systems, such as security systems or garage door systems, each receiver must be properly programmed with the proper code. As an example, if a person desired to operate, with the same remote control system, several vehicles and garage doors, it is necessary to have a receiver in each car and a receiver in each garage door system pre-programmed by a manufacturer. This necessarily requires custom design efforts which is very time consuming as well as costly.

Since most security systems and remote garage door openers operate with substantially less than one million code combinations it has been recently recognized that many commercially available electronic sequencing devices (often referred to as "electronic scanners") can, in effect, remotely decode that security code in a fairly short period of time. The electronic sequencers or scanners are capable of rapidly generating a large number of possible code combinations and when the right code combination has been generated, it will automatically disarm the security system. There is not any decoding-proof measure which is commercially available for preventing anyone from using an electronic sequencing apparatus to disarm a security system.

OBJECTS OF THE INVENTION

It is, therefore, one of the primary objects of the present invention to provide a radio frequency operated remote control system in which the receiver of the system can be electronically programmed by the user of the system without opening the transmitter, and without coding the transmitter or changing or encoding the receiver or acquiring dealer or manufacturer assistance.

It is another object of the present invention to provide a remote control system of the type stated in which neither the manufacturer, dealer or user of the system are required to know the particular code which is transmitted from the transmitter to the receiver.

It is a further object of the present invention to provide a method for a user of a remote control system to encode a receiver from a transmitter without any prerequisite skill or the need to even open the case of neither the transmitter nor the receiver.

It is also an object of the present invention to provide a remote control system of the type stated which does not require the provision of a separate decoder along with the receiver.

It is an additional object of the present invention to provide a remote control system of the type stated where completely different types of transmitters may be provided and where each transmitter may control totally different areas and they may operate with totally different numbers of possible codes.

It is yet another object of the present invention to provide a remote control system of the type stated where any of a multiplicity of transmitters may be added to or deleted from the system at will by the user.

It is still another object of the present invention to provide a remote control system of the type stated where each transmitter may be programmed to a different priority level, thereby enabling an accessing or controlling to pre-assigned functions.

It is still a further object of the present invention to provide a remote control system of the type stated which may be provided with an anti-scanning feature to preclude electronic scanning and unauthorized disarming of the system.

It is another salient object of the present invention to provide a remote control system of the type stated which can produce multi-billion codes thereby providing code security of at least two thousand times the code security of prior art systems and yet which can be manufactured at a relatively low cost.

With the above and other objects in view, my invention resides in the novel features of form, construction, arrangement, and combination of parts presently described and pointed out in the claims.

BRIEF SUMMARY OF THE INVENTION

A remote control access system which is comprised of at least one receiver connected to electronic or electrical equipment which will enable or perform various functions when activated and one or more transmitters which can actuate the receiver by generation of a code or encoded signal. As an example, one of the functions which may be enabled or performed is that of controlling an access opening. The receiver is operable with a control unit and this control unit is preferably a microprocessor control unit in accordance with the present invention. Moreover, the receiver and microprocessor control unit can perform all of the necessary decoding functions.

In one embodiment of the invention, one or more transmitters forming part of the system may have the provision of an encoder included therein. The one or more encoders will generate encoded signals upon actuation of the transmitters. This embodiment of the invention also comprises a receiver-control unit at the secured or protected environment, and is responsive to the encoded signal and enables operation of an access system.

The control unit is operable with the receiver at a protected or access controlled environment, and which is preferably a microprocessor operated control unit, as aforesaid. The control unit performs several primary functions including a decoding function. Thus, when the receiver receives the encoded signal, the microprocessor validates and decodes the transmitted signal. Thus, there is no requirement for the provision of a separate decoder in the protected environment.

The remote control access system of the present invention is also highly effective in that it is electronically user programmable. In effect, the receiver can be programmed by the user at any time. Moreover, no tooling or skills are required on the part of the user in order to program the receiver. The user is not even required to open the transmitter case or receiver housings when programming the system. The user of the system may initiate the receiver's program mode at any time so that it will enable recording and thereby enable recognition of subsequent messages or encoded signals from the transmitter. This may be accomplished by activating a record switch in the receiver, either mechanically, electronically or through voice recognition. Thereafter, the user actuates the transmitter, as for example, by pressing a switch on the transmitter. This will cause the encoded signal generated by the encoder to be transmitted by the transmitter to the receiver.

The receiver and control unit will operate to decode the transmitted signal and which decoded signal is then programmed into a memory unit, as hereinafter described, and becomes the control signal or so-called "signature control signal". In this sense, the system of the present invention is user programmable. Moreover, it is not necessary for anyone to know the specific encoded signal which is in the control unit, initially, or at any time thereafter. The control unit will, in effect, have received the signature of the transmitter and will record that signature in the random access memory of the microprocessor.

The receiver-control unit may be arranged so as to automatically exit the signature signal record mode after recording thereof. This automatic exit may occur for example, after a certain time delay in which no further signal has been received. Otherwise, the receiver may be arranged so that it is manually switched by the user out of the signature signal record-mode or so-called "program mode."

The receiver-control unit in the system of the present invention may also be operated by several transmitters, and each of which may be used to operate the receiver and control unit. Each transmitter may operate with a completely different code or encoded signal than any of the other transmitters and in this case, the receiver will be responsive to each transmitter which has its code or encoded signal recorded in the control unit as a signature control signal. It is not even necessary for the transmitters to be of the same type.

Each transmitter may have a totally different maximum number of digital code combinations. For example, one transmitter may have a ten-bit code and therefore, is able to produce one thousand twenty-four possible combinations of unique codes. Yet another transmitter may operate with a thirty-two bit code, thus possessing more than four billion possible digital codes. The construction and the operation of these transmitters may be different and each may have a different number of switches and/or codes, as aforesaid. However, it is important that each transmitter operate on the same frequency as the receiver.

In accordance with the above if a plurality of individuals are required to have access to the arming and dis-arming of the system, each may be provided with the same or different transmitters. Each such individual will initially operate his or her transmitter to record the signature of that transmitter in the random access memory of the microprocessor, as one of the control signals or signature control signals. After this has been accomplished, each party using any one of the transmitters, whose signatures have been recorded, may then access the system by either arming or dis-arming the system, or enabling specific functions assigned only to one or more specific transmitters. Moreover, the system may be armed by one transmitter and disarmed by a second transmitter, re-armed by a third transmitter, and disarmed by a fourth transmitter, etc.

Any one of the transmitters may also be programmed out of the system, that is deleted from the system, by first entering the recording or program mode, and then programming repeatedly, the rest of the transmitters until the memory of the control unit is fully loaded.

In the event that any particular transmitter is lost or stolen, it is only necessary to erase the recorded signature control signals in the memory and re-record the signature control signals from the other transmitters which have not been lost or stolen. In this way, anyone who attempts to use the lost or stolen transmitter will not be able to arm or dis-arm the remote control access system. There is essentially no breach in security inasmuch as one must have access to the receiver-control unit which is generally located in the secured environment.

The remote-control access system of the present invention may assign different access or controlling functions to different transmitters. As an example, one transmitter may have access to a first portion of a secured environment, a second transmitter may have access to a second portion of a secured environment, etc. In like manner, one transmitter may have access to a first portion of a secured environment and a second transmitter may have access to that first portion and another portion of a secured environment. In this way the arrangement is highly effective for controlling parties having access to classified information. Thus, one party having access to a lower level of classified information will have access to an area containing that information. Another party having access to an intermediate level of classified information will have access to the areas containing the lower level of classified information and the area containing the intermediate levels of classified information. Parties having access to a high security level of information as for example, a "top secret" level of information will have access to all levels of information.

The arrangement for controlling access to different areas of a secured environment is easily accomplished with the system of the present invention. It is only necessary to record the signature control signals from those transmitters into receiver-control units which are designed to enable access to certain areas. Thus, a transmitter which is designed to provide access to a first secured area will have its signature control signal encoded in the receiver-control unit at the access opening of that first area. A transmitter permitting access to a second secured area will have its signature control signal recorded in the receiver-control unit located to control the access opening to both the first secured area and the second secured area.

In still another embodiment of the present invention, the remote control system may be provided with an anti-scanning feature. The anti-scanning feature prevents a so-called "breaking" of the encoded signal. Heretofore, it was possible, in a given time frame, to generate a large number of coded signals and essentially all possible combinations thereof, for example 16,000 possible combinations with an electronic scanner. The present invention will preclude the arming or dis-arming of the security system by the prior art scanning procedures.

The microprocessor is constructed, in this embodiment of the invention, to operate in such manner that it will not permit arming or disarming of the system for a pre-determined time period in the event of the receipt of an unauthorized or invalid encoded signal, as for example, a four-second delay. Thus, a typical scanner which generates coded signals on a rapid basis, usually much faster than the time delay period, will attempt to transmit a large number of coded signals in a short time frame to the receiver in the anticipation that one of the coded signals would arm or dis-arm the system. However, on each occasion that the the control unit detects an improper or invalid coded signal, the time delay is continued. Thus, if a first encoded signal is an invalid code or an unauthorized signal, the control unit will not permit operation of the security system for a pre-set time delay. If any successive encoded signal is also an invalid code or an unauthorized signal, then the pre-set time delay is continued for an additional pre-set time delay increment and so forth. The disabling time of the decoder in response to each invalid code is longer than the time it takes to generate a code by the scanner's encoder. Thus, even when a valid code is transmitted, it will not deactivate the system since it was preceeded by an invalid code. In this way, a conventional scanning device could not generate the proper coded signal in a time domain necessary to arm or disarm the security system.

The microprocessor operated control unit also performs a reading function and a comparison function. In the reading operation, the control unit will read two or more successive and sequentially transmitted and decoded signals and will recognize them as correctly (authorized—not necessarily valid) transmitted signals, if two or more successive transmitted signals correspond. In this way, the control unit can determine if there is an error in transmission.

In the comparison function, the control unit will read a transmitted and decoded signal which is often referred to as a "received signal", and then compare that transmitted and decoded signal to a stored code or stored encoded signal which has been previously stored in the random access memory of the processor. Thus, and in this respect, the microprocessor operated control unit will perform a comparison function. This stored signal is typically referred to as a "control signal" or a "signature signal" since it is, in effect, the signature signal transmitted from the transmitter.

In the comparison operation, if the encoded signal which has been received and decoded corresponds to a previously recorded signal or signature signal, then the control unit will recognize the received decoded signal as a valid signal. Contrarywise, if the received and decoded signal does not correspond a previously recorded signature signal, the microprocessor will recognize that received and decoded signal as an invalid and unathorized signal and will not enable a disarming of the security system.

If the signal which has been decoded and compared does correspond to a previously recorded signal and is thereby a valid signal, then the microprocessor will either enable or disable or initiate various commands. For example, if the security system was armed when the valid decoded signal was received, then the microprocessor will enable a disarming of the system. If the system was dis-armed when the valid decoded signal is received, then the microprocessor will enable an arming of the security system.

The term "signal", and particularly with reference to an encoded transmitted signal or a received and decoded signal, is used in a general sense to refer to a transmitted or received code which may be comprised of a plurality of bits and/or bytes of information. Thus, as a simple example, in one of the embodiments of the system of the present invention, the encoded signal may be comprised of eighteen bits of information.

In view of the above, it can be observed that among the very significant advantages offered by the remote control security system of the present invention are the following:

1) The security system is self-programmable by a user at any time in such manner as the user can merely actuate a switch-type element on the receiver and press a button on the transmitter for automatically programming a selected code into the receiver as a signature control signal, 2) A signature control signal may be eliminated from the receiver-control unit by recording the codes of the desired transmitters several times until the memory of the control unit is fully loaded.

3) It is not necessary for any one to know the code for triggering of the remote control system inasmuch as any code already programmed in the remote control transmitter will be automatically recorded into the memory of the receiver-control unit when the receiver-control unit is in the program mode and the remotely located transmitter is activated.

4) The security level of the present invention can be upgraded by the user at any time, as for example, by utilizing upgraded transmitters with a substantially greater number of digital codes, or the like, and which is virtually impossible in any of the prior art remote control security systems. In this way, for example, the remote control system can be upgraded by the owner, at will, from 16,000 combinations of digital codes to over 4 billion digital code combinations without modifying or installing a new system.

5) In reading the encoded signal transmitted from the transmitter, a reading operation is conducted by the control unit associated with the receiver on two consecutive received signals to ensure that there is no error in the received signals before determining if that received and decoded signal compares to the signature control signal.

6) The transmitter and receiver are uniquely designed so that neither has to be opened and electronic or mechanical knowledge is not required for installing a new encoded signal at any time.

7) The remote control access system of the invention can operate with numerous types of transmitters, so long as they essentially operate at the same frequency range. This enables the purchase of transmitters from a source different from the receiver and control unit.

8) The remote control access system of the invention can operate by controlling access to different areas of a secured environment with different transmitters. Thus, one transmitter may provide access to a first portion of a secured area and a second transmitter may provide access to a second portion of a secured area.

9) The remote control security system of the present invention possesses an anti-scanning feature that makes it virtually impossible to determine the encoded signal by electronic scanning.

10) The remote control system of the invention also uses significantly fewer electronic components than the prior art systems, and as an example, a decoder is not required inasmuch as the microprocessor can perform the decoding function.

The above identified advantages are only a non-limiting list, but include some of the significant advantages which are achieved by the system of the present invention.

In one of the preferred environments of the invention, the remote control access system of the invention is used in conjunction with or forms part of a security system, as for example, an automotive vehicle security system. Although the invention is not so limited, the remote controlled system of the invention will be described in connection with and as a part of an automotive vehicle security system.

While the remote control access system of the present invention has been designed for use with vehicles, and more specifically, for use with automotive vehicles, the security system can be used with essentially any form of vehicle, including airplanes, boats, trucks, and the like. Moreover, the security system is highly effective for use in buildings, including dwelling structures, office buildings, garages and the like. Thus, with little or no modification, the access system is capable of being used in a wide variety of environments and is therefore highly versatile.

This invention possesses many other advantages and has other purposes which may be made more clearly apparent from a consideration of the forms in which it may be embodied. These forms are shown in the drawings accompanying and forming part of the present specification. They will now be described in detail for purposes of illustrating the general principles of the invention, but it is to be understood that such detailed description is not to be taken in a limiting sense.

BRIEF DESCRIPTION OF THE DRAWINGS

Figure 1:
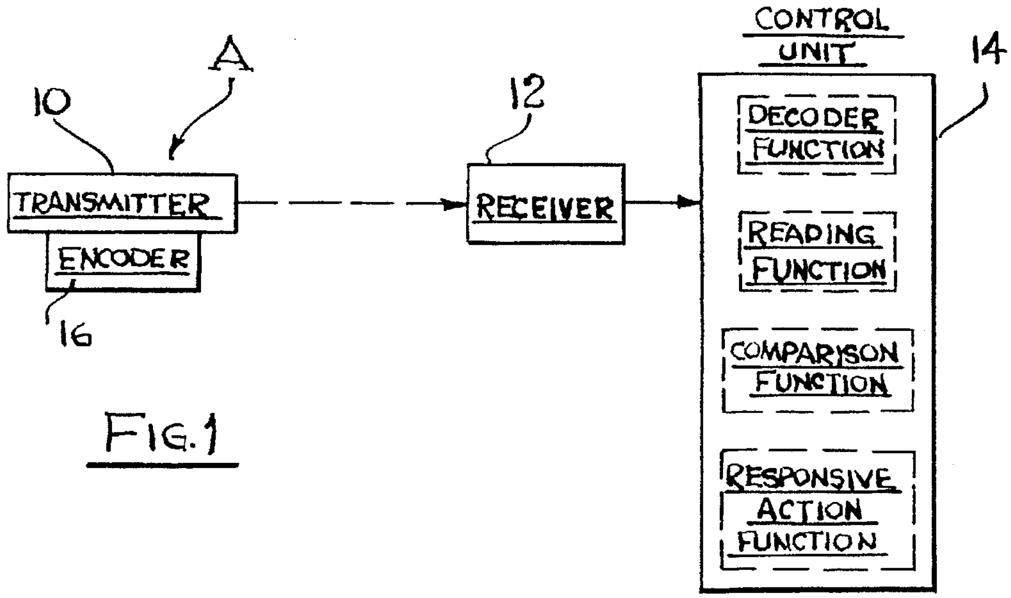
Figure 2:
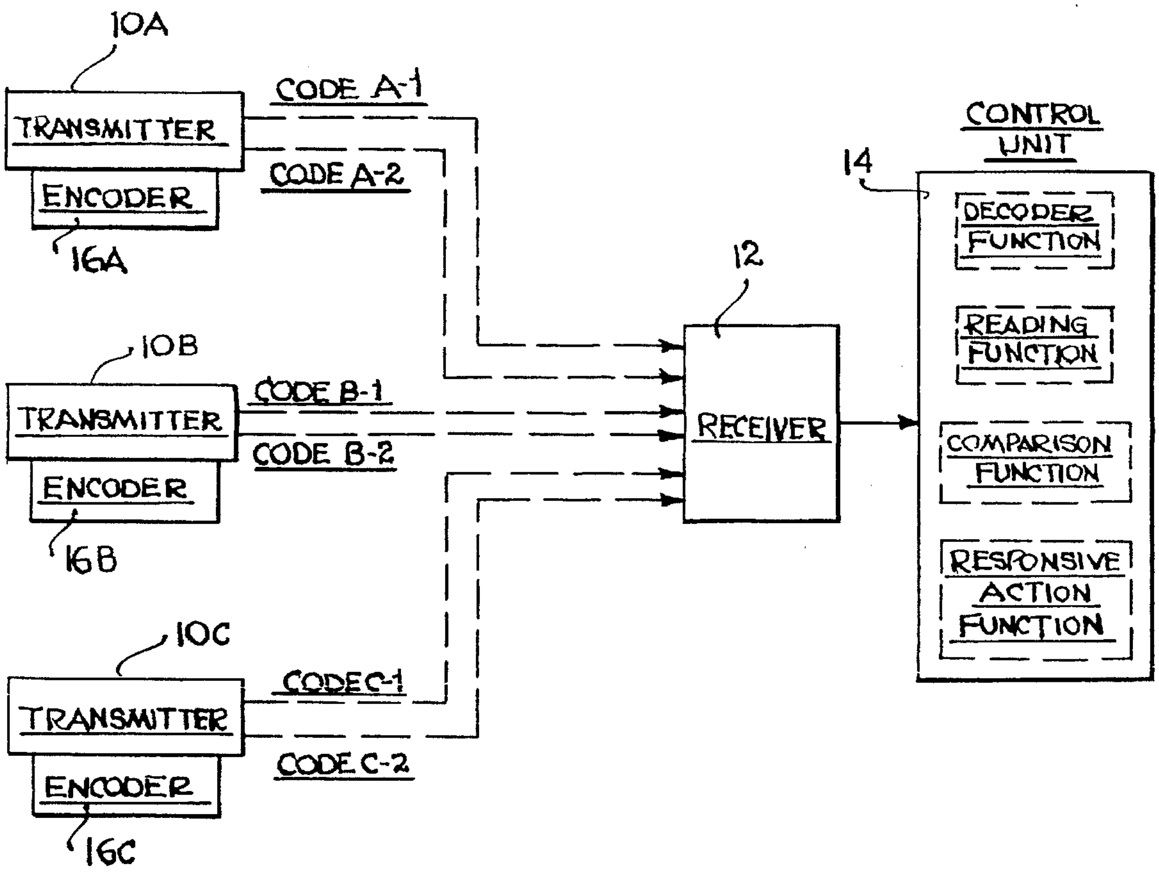
Figure 3:
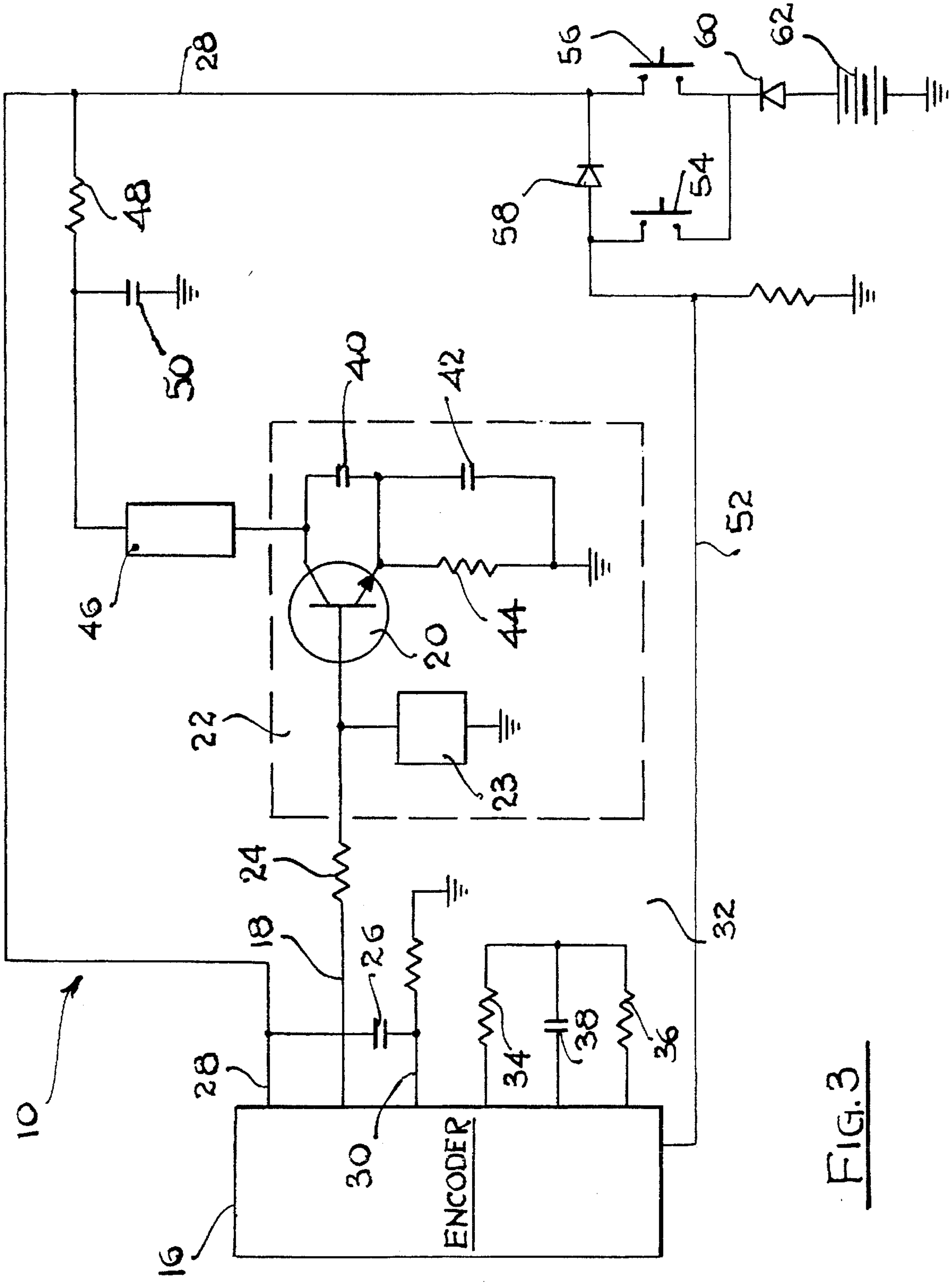
Figure 4:
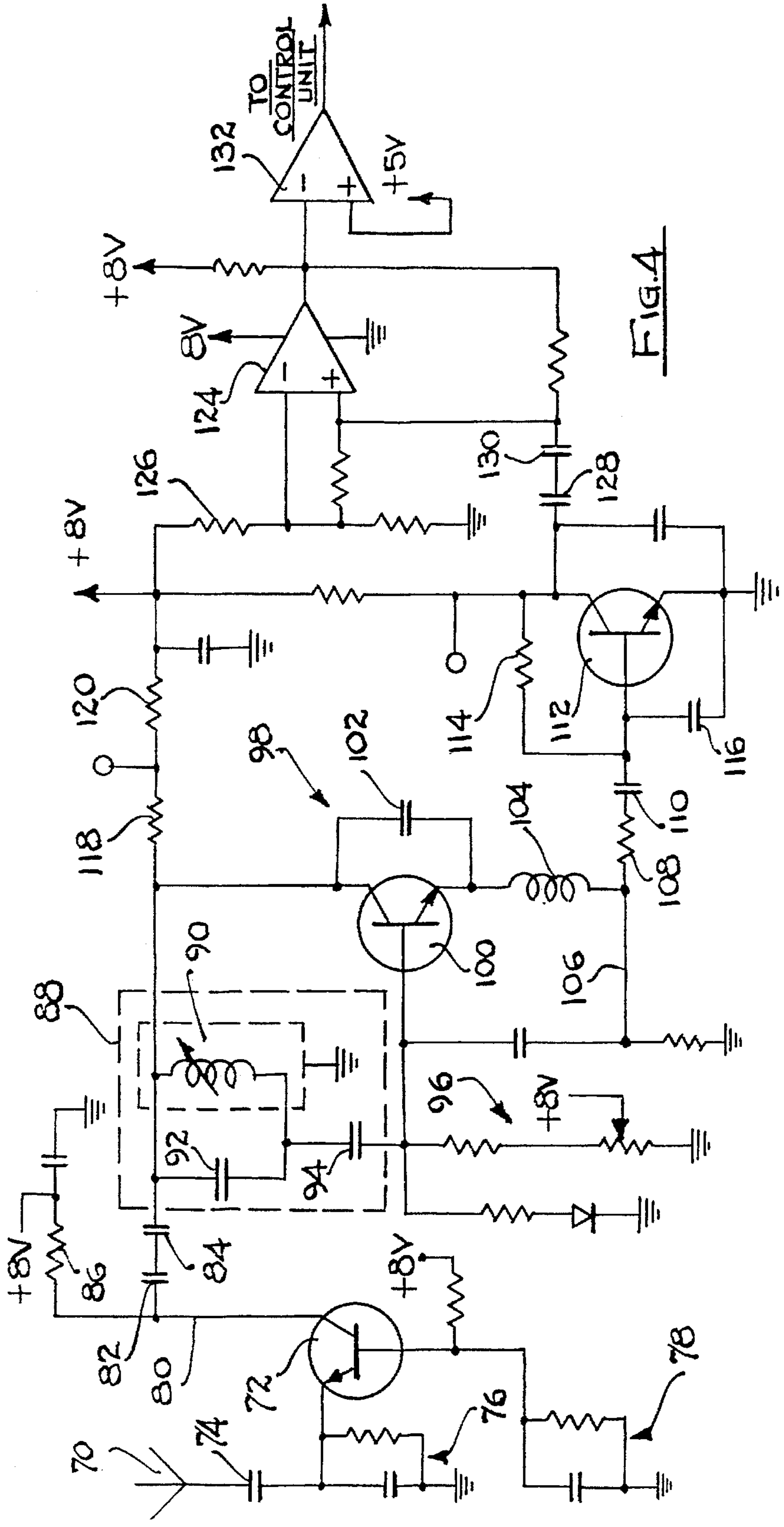
Figure 6:
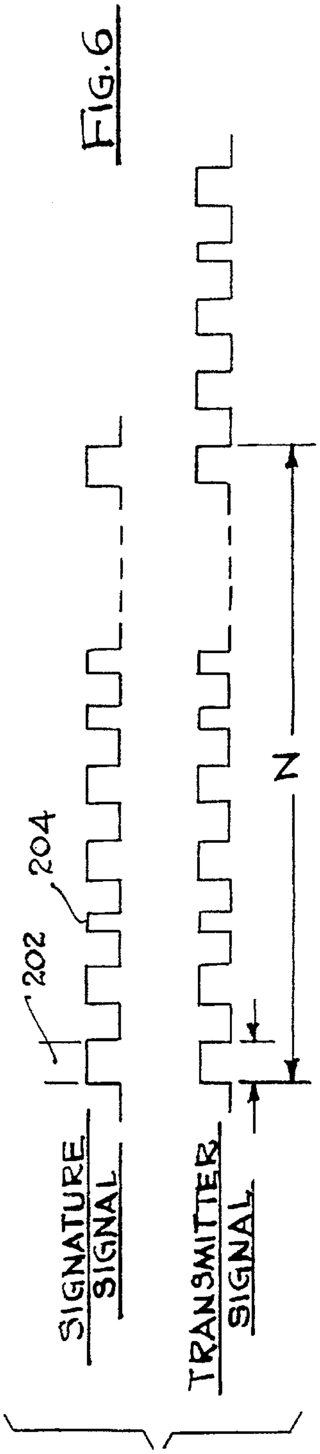
Figure 5:
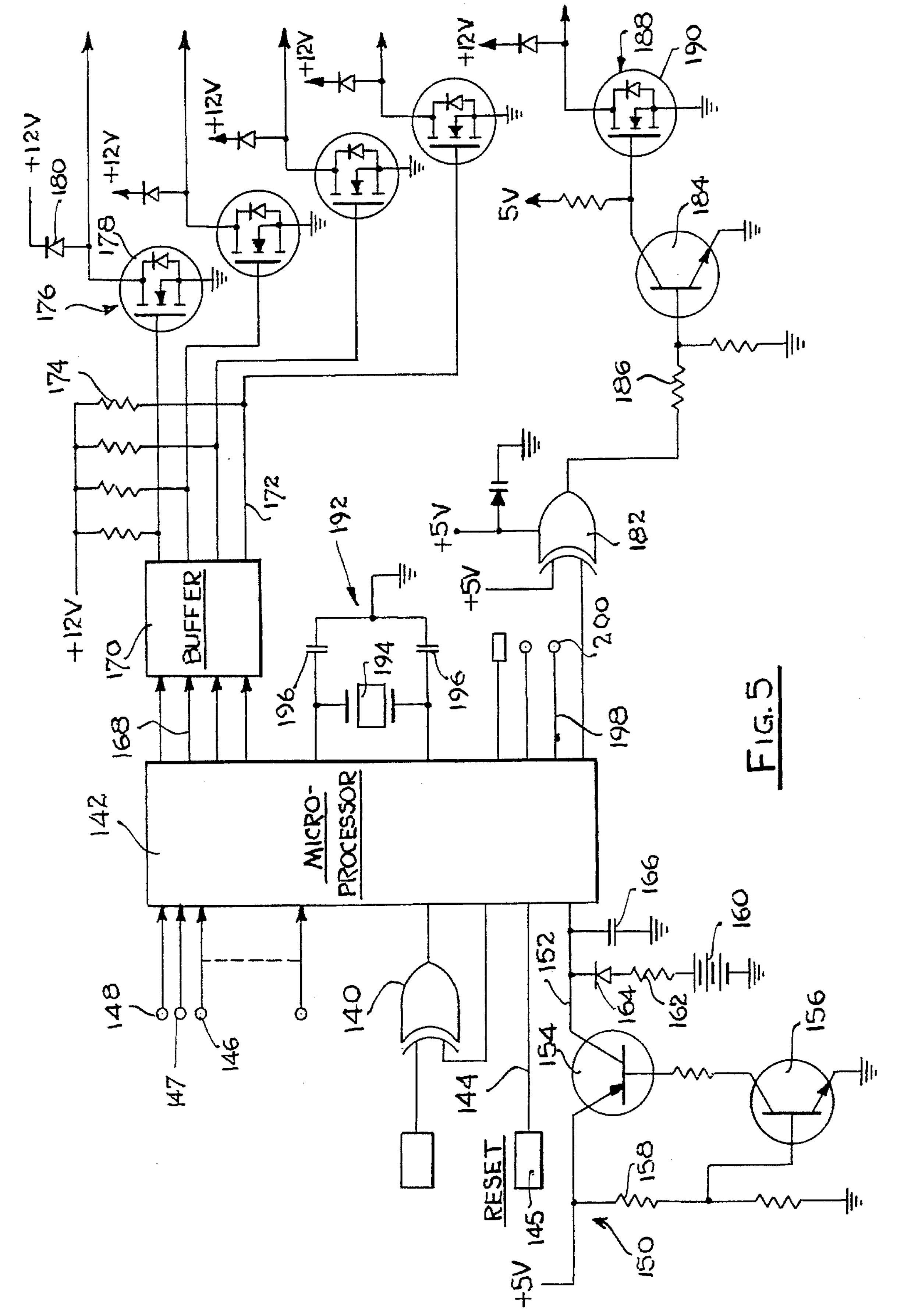

Having thus described the invention in general terms, reference will now be made to the accompanying drawings (four sheets) in which:

FIG. 1 is a block diagram of the major components of a remote control security system constructed in accordance with and embodying the present invention;

FIG. 2 is a block diagram of a modified form of the remote control security system constructed in accordance with and embodying the present invention;

FIG. 3 is a schematic electronic circuit view showing a portion of the transmitter forming part of a remote control security system of the present invention constructed in accordance with and embodying the present invention;

FIG. 4 is a schematic electronic circuit view showing one embodiment of a receiver forming part of a remote control security system constructed in accordance with and embodying the present invention;

FIG. 5 is a schematic electronic circuit view showing the control unit forming part of the remote control security system constructed in accordance with and embodying the present invention; and FIG. 6 is a timing diagram of a plurality of wave forms showing a transmitted encoded signal.

DETAILED DESCRIPTION OF PREFERRED EMBODIMENTS OF THE INVENTION

Referring now in more detail and by reference characters to the drawings which illustrate practical embodiments of the present invention. A designates a remote control system in the form of a remote control security system. As indicated previously, a security system is only one form of an access control system which controls the access into buildings or vehicles or like environments. However, since the remote control system of the invention finds a preferred use in security systems, it will be described in connection with a remote controlled security system, although it is to be understood that the invention is not so limited.

The security system is comprised of a transmitter unit 10, a receiver 12, and a microprocessor based control unit 14. The transmitter 10 is schematically shown as including an encoder 16 forming a part thereof. Moveover, the control unit is shown with various functions which may be performed therein or in conjunction therewith. As an example, these functions may be performed by programming various steps into the microprocessor, or otherwise, they could be performed by discrete apparatus carrying out the functions as identified but which would operate in conjunction with the control unit 14.

FIG. 3 illustrates one embodiment of a transmitter unit which may be constructed in accordance with and embodying the present invention. However, inasmuch as numerous transmitters may be used in accordance with the present invention, as previously described, this particular embodiment of the transmitter is only one of the preferred embodiments, although other electrical circuit arrangements could be employed with the transmitter.

The transmitter 10 generally comprises the encoder 16, as aforesaid, and which may be suitably encoded by the manufacturer so that the user is not required to encode the same. For this purpose, small switches may be provided on the encoder, or other means known in the art, could be provided on the encoder for specifically generating an encoded signal. A plurality of output lines 18 extend from the encoder 16 in the manner as illustrated in FIG. 3. One such output an line 18 is connected to an NPN transistor 20 forming part of an oscillator transmitter 22, as illustrated by the dotted lines in FIG. 3. The conductor 18 is actually connected to the base of the transistor 20, as shown. The conductor 18 is also connected through a resonator 23 which is in turn, grounded. A resistor 24 is located in the conductor 18 and serves as a current limiter due to the fact that the transistor 20 is a low impedance device.

A capacitor 26 is connected across an additional pair of conductors 28 and 30, in the manner as shown, and which operates as a reset circuit. This ensures that the encoder will start the generation of each new encoded signal when actuated on each occasion.

In addition, a resistive-capacitive network 32 is also connected to the output of the encoder 16 in the manner as shown in FIG. 3, and comprises a pair of resistors 34 and 36 and a capacitor 38. This circuit arrangement stabilizes the length of each of the bits which are generated by the encoder 16. This is important in connection with the present invention in that the receiver and the control unit may measure the lengths of the bits in order to determine the status of these bits, that is, whether they are a "1" or a "0".

The transistor 20 has a capacitor 40 connected across its emitter and collector in the manner as shown, and an additional capacitor 42 is connected to a resistor 44 on the emitter of the transistor 20. The capacitors 40 and 42 are generally provided for load matching purposes and the resistor 44 provides a control bias to the transistor 20.

Connected to the collector of the transistor 20 is a load circuit 46, as for example, a portion of an antenna load. This load circuit 46 is connected through a resistor 48 to the output conductor 28 of the encoder in the manner as shown. A capacitor 50 is also connected to the load circuit 46 and is grounded. In effect, the point where the capacitor is connected to the load circuit, represents a ground level value. The resistor 48 and the capacitor 50 operate to de-couple a battery as hereinafter described.

Also connected to the conductor 28 and to an additional conductor 52 are a pair of manually operable switches 54 and 56. These switches 54 and 56 are operable for providing two channels to the encoder. Thus, one of the switches, when actuated, will cause the generation of a first encoded signal. The other of the switches 56, when actuated, will cause the generation of a second encoded signal. It should also be observed that a diode 58 is connected across the switches 54 and 56, in the manner as illustrated, and a diode 60 is also connected between the switchs 54 and 56 and a battery 62.

As indicated previously, the transmitter, as illustrated, is a two-channel transmitter, which is highly preferable in accordance with the present invention. In this way, two individual encoded signals could be generated by actuation of each of the switches 54 and 56 as aforesaid. However, it should also be understood that a single channel encoder could be used. Moreover, various multiple channel encoders, such as, for example, a three-channel encoder or a four-channel encoder, etc. could be employed with slight modification of the circuitry as described herein.

When any one of the switches 54 or 56 are closed, they will complete a circuit to the encoder 16, causing generation of an electrical signal over the conductor 18 and which is, in turn, transmitted as a radio frequency signal, via the load 46 to the receiver 12.

The receiver 12 is more fully illustrated in FIG. 4 of the drawings and generally comprises an antenna 70 for picking-up the transmitted signals and which are introduced into an NPN input-matched impedence transistor 72 which matches the impedence of the antenna 70. This transistor 72 operates as a radio frequency pre-amplifier. A capacitor 74 between the antenna 70 and the pre-amplifier operates as a coupling capacitor. A resistive-capacitive network 76 is connected to the emitter of the transistor-pre-amplifier 72. Moreover, a second resistive-capacitive network 78 is also connected to the base of the transistor-pre-amplifier 72.

The collector of the transistor-pre-amplifier 72 is connected to an output conductor 80 which includes a pair of coupling capacitors 82 and 84. Moreover, an 8-volt power supply is connected to the collector of the resistor-pre-amplifier 72 through a resisitor 86 which isolates the transistor 72 from the power supply and also from the load.

The conductor 80 is connected to a tank circuit 88 through the coupling resistors 82 and 84 and which comprises a variable inductive device 90 provided for adjusting the frequency of the receiver to the transmitter. A capacitor 92 couples one end of the inductive device 90 to the conductor 80. That same end of the inductive device 90 is also connected through a coupling capacitor 94 to a variable resistor 96, in the manner as illustrated in FIG. 3. The variable resistor 96 is also connected to an 8-volt power source.

The conductor 80 is also connected to a local oscillator 98 which includes an NPN transistor 100 and a capacitor 102 connected across the collector end emitter of the transistor 100. The base of the transistor 100 is similarly connected to the voltage source through the resistor 96. Moreover, the emitter of the transistor 100 is connected to another inductor 104, in the manner as illustrated. This arrangement of the local oscillator including the transistor 100, the capacitor 102 and the inductor 104 is designed to detect the pulses included in the signal.

The output of the inductor 104 is connected to another conductor 106 which carries the detected signal. This conductor 106 serves as the main conductor for the pulses which are generated from the signal received from the transmitter. The detected signal pulses are passed through a resistor 108 and a capacitor 110 and to a signal amplifier 112 in the form of an NPN transistor. Another resistor 114 is connected across the collector and the base of the transistor 112. Moreover, the emitter is grounded and is also connected to a coupling capacitor 116.

The collector of the transistor 100 is also connected to a pair of load resistors 118 and 120, in the manner as illustrated in FIG. 4. In addition, a de-coupling capacitor is also connected to the conductor 80 in the manner as illustrated. Further, an 8-volt power supply is connected through a load resistor 122 to the collector of the transistor 112. At the point where the 8-volt power supply is connected to the conductor 80, a DC voltage is available. Moreover, this DC voltage may be applied to a comparator 124 through a resistor 126. Moreover, the comparator 124 receives a signal for comparison from the collector of the amplifier-transistor 112 through a pair of coupling transistors 128 and 130. When the signals in the comparator 124 do compare, an output is generated which is introduced into an inverter 132 for generating an output therefrom.

The output of the inverter 132 is then introduced into the control unit 14, which is more fully illustrated in FIG. 5 of the drawings. In this case, more specifically, the output from the receiver 12 is introduced into an exlusive NOR gate 140 which has an output to a microprocessor 142. The exclusive NOR gate 140 actually operates as an inverter. Moreover, it is preferably a programmable inverter. Furthermore, the microprocessor 142 receives a conductor carrying a reset input signal 144 from a reset signal generating circuit 145, as shown in FIG. 5. This reset signal generating circuit 145, which is sometimes referred to as a "watchdog" circuit, will automatically generate a reset signal each time that power is applied to the system, that is, each time that the system is "powered-up".

The reset signal generating circuit 145 may adopt any form of circuit which is capable of generating a reset signal. However, in the embodiment employed, a re-triggerable one-shot is connected to and operable in conjunction with a standard one-shot and capacitor. The capacitor may be committed to the standard one-shot through an NPN transistor and grounded. The collector of the NPN transistor would then be connected to the conductor 144. This arrangement has not been illustrated or described in any further detail herein inasmuch as any standard resetting circuit arrangement could be employed.

The microprocessor 142 also receives a plurality of input signals 146, 147, and 148, and where the input signal 148 represents a program signal or a signal from a program switch which may be located in the protected environment, as for example, the vehicle or dwelling structure or the like. The other inputs 146 and 147 into the microprocessor 142 are from sensors (not shown) and which sensors may adopt, for example, the form of a hood lock sensor, a vibration sensor, etc. Otherwise, other forms of input signals may be generated and introduced into the microprocessor 142 in the same manner as any of the signals 146.

The microprocessor 142 may be powered by means of a battery circuit 150, as shown in FIG. 5 and which comprises a conductor 152. The conductor 152 may be connected to a suitable 5-volt power source in the manner as shown. Also located in the conductor is an NPN transistor 154 which effectively functions as a diode to prevent current from moving back towards the 5-volt source and only enables current to be delivered to the microprocessor 142. The gate of the NPN transistor 154 is connected to the collector of another NPN transistor 156 in the manner as shown. The base of this transistor 156 is connected between a voltage dividing circuit 158 which controls the threshold voltage applied to the microprocessor 142. A battery 160 is connected to the conductor 152 through a resistor 162 and a diode 164 in the manner as illustrated. A grounding capacitor 166 is also connected to the conductor 152 in the manner as illustrated in FIG. 5.

The microprocessor 142 has a plurality of output signals 168 which are generally 4-volt signals and which are introduced into a buffer-amplifier 170. This buffer-amplifier 170 produces a plurality of outputs 172. Moreover, each of the outputs 172 are connected to a 12-volt power source through coupling resistors 174 in the manner as illustrated, such that the outputs are raised to 12 volts. Each of the amplified signals 172 are then introduced into output circuits 176 in the manner as illustrated in FIG. 5.

The output circuits of FIG. 5 each generally comprise a field-effect transistor 178 which is connected through diodes 180 to a 12-volt power source. The various outputs from the output circuits 176 may provide responsive functions in the protected environment. For example, a first output 176 may generate a siren. A second output may provide for a pulsed alarm. A third output may provide for an automatic door lock or an automatic unlocking of a door. Another output may provide for an ignition cut-off, that is, so that the ignition of a vehicle could not be started in the event of an intrusion or an unauthorized entry into the vehicle. Other forms of outputs could similarly be provided.

A special output from the microprocessor 142 in the form of a hood unlock signal is introduced into an inverter assembly 182 and then into an NPN transistor 184 which amplifies the signal. A coupling resistor 186 connects the base of the transistor 184 to the output of the inverter. Finally, the collector of the transistor 184 is connected to an output circuit 188 which is also comprised of a field effect transistor 190. This signal serves to automatically unlock the hood when generated. The generation of the hood unlock signal is authorizedly initiated by the control unit 14 of the system for a thirty-second time period after initially disarming the system.

Also connected to the microprocessor 142 is an oscillator control circuit 192 comprised of a crystal oscillator 194 and having a pair of capacitors 196 connected to the outputs thereof. This crystal oscillator 192 generates a control frequency which controls the speed of operation of the microprocessor 142 and generates the clocking signals therefore.

The microprocessor 142 also generates a plurality of control light outputs 198 which may control light emitting diodes 200 or other forms of light emitting devices. A pair of these signal light outputs may inform the user whether the system is turned on or off and a third of the signal light outputs 198 may inform the user if the microprocessor is running code in a correct sequence. It should be understood that other forms of output signal lights for generating other informational outputs may be employed in accordance with the present invention.

OPERATION OF THE SYSTEM

The operation of the security system has been described in connection with the detailed description thereof.

However, the following should provide a brief summary of the operation of the various embodiments of the system.

The encoder 16 may be operated by actuation of one of the switches 54 or 56, as previously described. The encoder will thereupon generate a coded signal which is transmitted by the transmitter 10 as a radio frequency signal. The signal is then received by the receiver 12 and which will process the signal and generate an electrical signal output at the inverter 132. The signal from the inverter 132 is introduced into and decoded in the control unit 14, as aforesaid.

When the user desires to match a transmitter to the receiver, the receiver will first be placed in the program mode. This may be accomplished, as aforesaid, by enabling a switch in the receiver into a program position. The switch may be activated manually or electronically or through voice recognition. When the receiver is then in the program mode, any transmitter which is to have its signature control signal recorded therein is actuated to generate an encoded signal. This encoded signal will then be recorded as a signature control signal in the receiver-control unit. If only one transmitter is actuated, only a single signature control signal will be recorded in the receiver-control unit. If different transmitters are actuated when the receiver is in the program mode, each of those actuated transmitters will have its own signature control signal recorded. The receiver will exit the program mode automatically after a preset duration where the receiver is then in a condition to receive and decode subsequent encoded signals.

All subsequent signals will be compared against these signature control signals. If the subsequent signals are identical to the any of signature control signal, then they will be recognized as a valid encoded signal and will thereupon arm or disarm the security system. However, if they do not conform to the signature control signals which have been recorded, then the subsequently transmitted and decoded signals will not arm or disarm the security system.

As indicated previously, the transmitter may be capable of generating one or two individual encoded signals by actuation of the switches 54 and 56. Thus, either of the encoded signals from a single transmitter may be used to operate the control unit. In like manner, the control unit could be operated in such manner that both encoded signals are required before the system can be armed or disarmed. In this way, the security of the system is further enhanced.

The user of the system can also easily delete one of the transmitters from the system by removing the signature control signal of that transmitter from the control unit. In this case, the signature control signal of the transmitter can be deleted from the system, depending upon the specific programming of the receiver-control unit. In one of the preferred embodiments, if the receiver is placed in the program mode and the signature control signal is generated on a plurality of successive occasions, such as four successive occasions in close sequence, that will cause an automatic deletion of the signature control signal and hence, that transmitter from the system.

In accordance with the above identified circuit arrangement it can be understood that it is not necessary for the user or the dealer, or the installer of the system to either understand or to have knowledge of the specific encoded signal which is generated in order to add or delete any transmitter from the remote control access system. Thus, the user does not have to actuate any predetermined number of switchs or other input means, such as scratch a circuit pattern on a printed circuit board in order to generate the encoded signal. Indeed, the user or dealer or installer does not have to possess and use any of the special techniques for encoding the transmitter and which usually requires the intervention of skilled personnel. Moreover, it is not even necessary for the user or the dealer or installer to open either the transmitter or the receiver in order to record the signature control signal.

When in the program mode and when a signal is transmitted from any one or more transmitters, that signal will be received by the receiver and decoded by the control unit. After decoding, the received signal will then be recorded in the memory of the control unit as a signature control signal. This will occur with each signal received from any transmitter when in the program mode. When the receiver is in the receive mode, no further recording can be accomplished until the receiver is switched back to the program mode. When in the receive mode, if any encoded signals are generated and received by the receiver, they will be decoded and compared against the recorded signature control signals which have been recorded in the memory unit. If there is no comparison with any signature control signal, the received signal will be recognized as an invalid signal and will not arm or disarm the system.

In accordance with the above-identified construction, it can be observed that additional transmitters can be added to or deleted from the system at will. Moreover, it is not necessary to have the intervention of skilled personnel, such as a dealer or installer, to add or delete the transmitter from the system inasmuch as this can be easily accomplished by the user of the system. The system of the invention is also highly effective in that it may be used with many transmitters and also many different types of transmitters and with transmitters operating on different coded bases. The use of the system with a plurality of differing types of transmitters is more fully illustrated in FIG. 2 of the drawings.

In this case, it can be observed that a first transmitter 10A and associated encoder 16A generate a first code A1. This transmitter 10A and encoder 16A will generate a second code A2 if a pair of channels are provided on this transmitter-encoder combination. Thus, and for this purpose, the circuit arrangement of FIG. 3 would be employed utilizing both switches 54 and 56. In like manner, a second transmitter-encoder combination comprised of a transmitter 10B and an encoder 16B are provided for purposes of generating a code B1 and an encoded signal B2. Finally, a third transmitter-encoder combination comprised of a transmitter 10C and an encoder 16C are capable of generating a first encoded signal C1 and a second encoded signal C2. As also indicated previously, any of these transmitters could be used with more or less than two channels for generating any desired number of codes.

In accordance with the arrangement as illustrated in FIG. 2, it can be observed that each of these transmitters and encoders may be of different types and each will generate different encoding signals. Nevertheless, on the first occasion when each of these transmitters are used, they will be used in such manner so as to operate the control unit to record a signature control signal. Thus, each of the three transmitter-encoder combinations will have their signature control signal recorded in the control unit. On each subsequent occassion, when they are actuated, they will be capable of arming and dis-arming the security system, in the manner as previously described.

One of the unique aspects of this invention is the fact that any conventional transmitter can be used as long as it is operating on the same frequency as the receiver. Thus, if the user of the system loses one of the transmitters or desires to upgrade the system with another transmitter with more digital codes and higher security, it is not necessary to install an entirely new system. The user merely buys another transmitter and records the signature control signal in the microprocessor of the control unit 14.

Moreover, it is important to note that it is not necessary to have each transmitter, such as the transmitter-encoder combination illustrated in FIG. 2, to generate the same encoded signal. Thus, the user may merely provide additional authorized parties with transmitters for obtaining access to the security system without an elaborate time consuming and costly recording of a particular transmitter. It is necessary to only record once the signature control signal of that transmitter in the control unit, as aforesaid.

Another one of the unique aspects of the invention is that the encoded signal cannot be deciphered by electronic scanning techniques. As previously described, the microprocessor operated control unit generates a time delay between the processing of any received and decoded signal. Thus, if the first received and decoded signal is not a valid code, the microprocessor will generate a time delay before reading any other transmitted signal, and which time delay which is longer than the time required for a scanner to generate the necessary subsequent coded signals. Thus, if an electronic scanner is in operation each time that it transmits an invalid code it will disable the control unit. As the scanner steps through the various code possibilities, even when it transmits the correct code preceded and followed by an invalid code the microprocessor will not recognize the valid code since the previous invalid code will have caused an inhibiting of any subsequent reading of a code, whether or not a valid code, for a time period which is far too slow for any scanner stepping through successive codes. Thus, any valid code which is generated by the scanner would automatically be masked and not read by the receiver-control unit.

In accordance with the present invention, it is also possible to simultaneously use any number of coded combinations, as for example, a 14-bit encoded signal which could result in sixteen thousand encoded signal combinations. In like manner, it is possible to use a 20-bit signal which could result in up to one million encoded signal combinations, etc. In essence, the system of the present invention is virtually unlimited to the number of codes which can be used or the number of bits in any encoded signal.

The system of the invention is also capable of comparing two or more sequential encoded, transmitted and decoded signals to ensure that they are identical to one another. Thereafter, if the subsequently decoded signals are identical, they are then compared to the signature control signals. If the decoded signals match the signature control signal, then it is deemed to be a valid transmitted signal for purposes of arming or disarming the security system.

This arrangement for signal matching is more fully illustrated in FIG. 6 of the drawings. It can be observed that a signature control signal is shown in the upper portion of FIG. 6. The first of the bits, designated as 202 is a wider bit than another one of the bits 204 and thus, the bit 202 may represent, for example, a "1" signal, whereas the bit 204 may represent a "0" signal. Located beneath the signature signal is the transmitted signal which may have been decoded in the control unit. In this case, it can be observed that the transmitted signal is identical to the signature signal.

The transmitted signal has a length of n bits, in the manner as illustrated in FIG. 6. Located to the right of the transmitted signal is a second transmitted signal. In this case, it can be observed that the second transmitted signal is shown to be duplicate of the first transmitted signal. In this way, the two transmitted and decoded signals will compare in the comparator of the control unit. As a result, they will form a signal combination which may be compared against the signature control signal. In this case, it can be observed that the two transmitted signals are identical and are also identical to the signature control signal. As a result, the microprocessor operated control unit will recognize this as a valid decoded signal, enabling the user to have access to the security system for purposes of arming or disarming the same.

Contrarywise, it can also be observed, that if the second transmitted and decoded signal is not identical to the first transmitted signal, then there is no further comparison with respect to the signature control signal. There must be at least two or more sequential transmitted and decoded signals which are identical to one another before any comparison to the signature control signal can take place and hence, there must be the same comparison before any arming or disarming of the system can occur.

The microprocessor may also measure various other characteristics of the bits in order to determine whether or not a decoded signal is a valid signal. For example, the microprocessor could examine and compare bit length, the number of bits and the widths of the bits. Other characteristics, for example, amplitude or the like could also be used for determining whether a decoded signal is a proper or valid decoded signal.

Thus, there has been illustrated and described a unique and novel remote control radio frequency access system which includes many unique features, such as the fact that it can be operated by an encoded signal of which no person needs to have knowledge of the encoded signal for the purpose of coding the control unit and the fact that the transmitter does not need to be opened for coding. Moreover, the system can be operated by a plurality of transmitters, with each being of a different type and having different encoded signals and each may be added or deleted at will by the user. The system can also be operated in such manner that the code cannot be detected by electronic scanning. Thus, the present invention fulfills all of the objects and advantages which have been sought. It should be understood that many changes, modifications, variations and other uses and applications will become apparent to those skilled in the art after considering this specification and the accompanying drawings. Therefore, any and all such changes, modifications, variations and other uses and applications which do not depart from the spirit and scope of the invention are deemed to be covered by the invention which is limited only by the following claims.

Having thus described the invention, what I desire to claim and secure by letters patent is:

1. An electronically programmable remote control vehicle security system, comprising:

sensor apparatus mounted on said vehicle for detecting attempted intrusions to said vehicle;

vehicle antitheft apparatus;

a precoded remote control transmitter for generating and transmitting a non-user-programmable, digitally encoded radio frequency signal representative of a multiple-bit transmitter code, said transmitter including an actuator switch which when actuated by a user causes said digitally encoded radio frequency signal to be transmitted, said transmitter code being precoded so that a system user is not required to encode said transmitter or know said transmitter code;

a radio frequency receiver responsive to said radio frequency transmitter signal to provide receiver signals indicative of said transmitter code;

a system control unit disposed within said vehicle and having control over said vehicle antitheft apparatus, said control unit comprising:

a digital memory;

programming apparatus responsive to said receiver signals for recording in said memory only during a programming mode said transmitter code as a signature control signal for arming or disarming said vehicle antitheft apparatus;

operating apparatus operable during a system security operating mode and responsive to said receiver signals for comparing said receiver signals to said recorded signature control signal and arming said vehicle antitheft apparatus upon a first receipt and recognition of receiver signals corresponding to said signature control signal, and for disarming said antitheft apparatus upon a second receipt and recognition of receiver signals corresponding to said signature control signal.

2. The vehicle security system of claim 1 wherein said programming apparatus is operable in the program mode to record a plurality of different transmitter codes from a plurality of remote control transmitters as a plurality of different signature control signals, and wherein said operating apparatus is responsive to said receiver signals for comparing said receiver signals to each of said signature control signals to find a match, and arms said antitheft apparatus upon a first receipt and recognition of any one of said recorded signature control signals, and disarms said antitheft apparatus upon a second receipt and recognition of any one of said recorded signature control signals.

3. The vehicle security system of claim 1 wherein said system control unit includes a program switch disposed in said vehicle, and said system control unit is responsive to said switch for entering the program mode.

4. The vehicle security system of claim 1 wherein said remote control transmitter is encoded with said transmitter code by the manufacturer thereof.

5. The vehicle security system of claim 1 wherein operating apparatus is further responsive to intrusion attempt signals from said sensor apparatus for activating said vehicle antitheft apparatus upon tripping of said sensor apparatus only when said antitheft apparatus is armed.

6. The vehicle security system of claim 1 wherein said antitheft apparatus includes apparatus for disabling operation of said vehicle.

7. The vehicle security system of claim 6 wherein said apparatus for disabling operation of said vehicle includes circuitry for disabling an ignition system of said vehicle.

8. The vehicle security system of claim 1 wherein said antitheft apparatus includes an alarm device activated by said control unit for generating an alarm when an attempted intrusion is detected by said sensor apparatus while the antitheft apparatus is armed.

9. The vehicle security system of claim 1 wherein the operating apparatus is operable to perform a further function in addition to disarming said antitheft apparatus upon the second receipt and recognition of receiver signals corresponding to said signature control signal.

10. The vehicle security system of claim 9 wherein said further function includes unlocking a vehicle access location lock.

11. The vehicle security system of claim 1 further comprising apparatus for putting the system control unit in the programming mode without the use of the remote control transmitter code.

12. An electronically programmable remote control vehicle security system, comprising:

sensor apparatus mounted on said vehicle for detecting attempted intrusions to said vehicle;

vehicle antitheft apparatus;

a precoded remote control transmitter for generating and transmitting a non-user-programmable, digitally encoded radio frequency signal representative of a multiple-bit transmitter code, said transmitter including an actuator switch which when actuated by a user causes said digitally encoded radio frequency signal to be transmitted, said transmitter code being precoded so that a system user is not required to encode said transmitter or know said transmitter code;

a radio frequency receiver responsive to said radio frequency transmitter signal to provide receiver signals indicative of said transmitter code;

a system control unit disposed within said vehicle and having control over said vehicle antitheft apparatus, said control unit comprising:

a digital memory;

programming apparatus responsive to said receiver signals for recording in said memory only during a programming mode said transmitter code as a signature control signal for arming or disarming said vehicle antitheft apparatus;

operating apparatus operable during a system security operating mode and responsive to said receiver signals for comparing said receiver signals to said recorded signature control signal and arming or disarming said vehicle antitheft apparatus upon receipt and recognition of receiver signals corresponding to said signature control signal.

13. The vehicle security system of claim 12 wherein said remote control transmitter is encoded with said transmitter code by the manufacturer thereof.

14. A user programmable remote control vehicle security system, in which an encoded signal from a transmitter may be recorded as a signature control word and without a need for the user or an installer to have a knowledge of the encoded signal and which does not require access to the interior of the transmitter or receiver, said system comprising:

sensor apparatus mounted on said vehicle for detecting attempted intrusions to said vehicle;

vehicle antitheft apparatus;

a precoded remote control transmitter for generating and transmitting a non-user-programmable, digitally encoded radio frequency signal representative of a multiple-bit transmitter code, said transmitter including an actuator switch which when actuated by a user causes said digitally encoded radio frequency signal to be transmitted, said transmitter code being precoded so that a system user is not required to encode said transmitter or know said transmitter code;

a radio frequency receiver responsive to said radio frequency transmitter signal to provide receiver signals indicative of said transmitter code;

a system control unit disposed within said vehicle and having control over said vehicle antitheft apparatus, said control unit comprising:

a digital memory;

programming apparatus responsive to said receiver signals for recording in said memory only during a programming mode said transmitter code as a signature control signal for arming or disarming said vehicle antitheft apparatus, the programming apparatus in the programming mode requiring only the transmission of the encoded signal from the transmitter for recording as a signature control signal and thereby eliminating any need for access to the interior of the transmitter or receiver or control unit and thereby removes the need of the user or installer to have knowledge of the specific signature control signal;

operating apparatus operable during a system security operating mode and responsive to said receiver signals for comparing said receiver signals to said recorded signature control signal and arming or disarming said vehicle antitheft apparatus upon a receipt and recognition of receiver signals corresponding to said signature control signal.

15. The vehicle security system of claim 14 wherein said remote control transmitter is encoded with said transmitter code by the manufacturer thereof.

* * * * *